US009544972B2

(12) United States Patent
Scheidegger et al.

(10) Patent No.: US 9,544,972 B2
(45) Date of Patent: Jan. 10, 2017

(54) GATE VOLTAGE THRESHOLD TURN OFF FOR MAINTAINING VOLTAGE SUPPLY DURING STANDBY MODE OF A LIGHTING SYSTEM

(71) Applicant: General Electric Company, Schenectady, NY (US)

(72) Inventors: Nina Rose Scheidegger, East Cleveland, OH (US); Gang Yao, East Cleveland, OH (US); Carre Scheidegger, East Cleveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 29 days.

(21) Appl. No.: 14/537,361

(22) Filed: Nov. 10, 2014

(65) Prior Publication Data

US 2016/0135266 A1     May 12, 2016

(51) Int. Cl.
*H05B 33/08*     (2006.01)
*H05B 37/02*     (2006.01)

(52) U.S. Cl.
CPC ...... *H05B 33/0896* (2013.01); *H05B 33/0845* (2013.01); *H05B 37/02* (2013.01)

(58) Field of Classification Search
CPC .............. H05B 33/089; H05B 33/0842; H05B 37/0254
USPC ................................. 315/250, 194, 294, 224
See application file for complete search history.

(56) References Cited

U.S. PATENT DOCUMENTS

| 2003/0028261 | A1* | 2/2003 | Peterson | D06F 33/02 700/19 |
| 2006/0007011 | A1* | 1/2006 | Chivarov | G09F 21/04 340/815.45 |
| 2010/0085375 | A1* | 4/2010 | Chung | G09G 3/3406 345/589 |
| 2010/0327766 | A1* | 12/2010 | Recker | H02J 9/02 315/291 |
| 2011/0118890 | A1 | 5/2011 | Parsons | |

(Continued)

FOREIGN PATENT DOCUMENTS

| EP | 2717655 A1 | 4/2014 |
| WO | 2014111820 A2 | 7/2014 |
| WO | 2014117193 A2 | 8/2014 |

OTHER PUBLICATIONS

PCT Search Report and Written Opinion issued in connection with corresponding PCT Application No. PCT/US2015/59499 on Mar. 15, 2016.

*Primary Examiner* — Douglas W Owens
*Assistant Examiner* — Syed M Kaiser
(74) *Attorney, Agent, or Firm* — GE Global Patent Operation; Peter T. DiMauro

(57) ABSTRACT

Provided is a lighting system that includes a plurality of lighting elements to emit light, a power supply to supply power, a lighting driver including a microcontroller and to output power to the plurality of lighting elements for operation thereof, a control system to transmit a control signal to the microcontroller to initiate a standby mode of the plurality of lighting elements, and a semiconductor device configured to receive voltage from the microcontroller, and selectively enable and disable a low power consumption mode of the lighting driver, to thereby maintain voltage for communication between the microcontroller and the control system during the standby mode.

15 Claims, 3 Drawing Sheets

(56) References Cited

U.S. PATENT DOCUMENTS

| | | | |
|---|---|---|---|
| 2011/0133655 A1* | 6/2011 | Recker | H02J 9/02 |
| | | | 315/159 |
| 2012/0080944 A1* | 4/2012 | Recker | H02J 9/02 |
| | | | 307/25 |
| 2012/0206050 A1* | 8/2012 | Spero | B60Q 1/04 |
| | | | 315/152 |
| 2012/0212140 A1 | 8/2012 | Kim et al. | |
| 2015/0237693 A1* | 8/2015 | Knoedgen | H05B 33/0815 |
| | | | 315/224 |

* cited by examiner

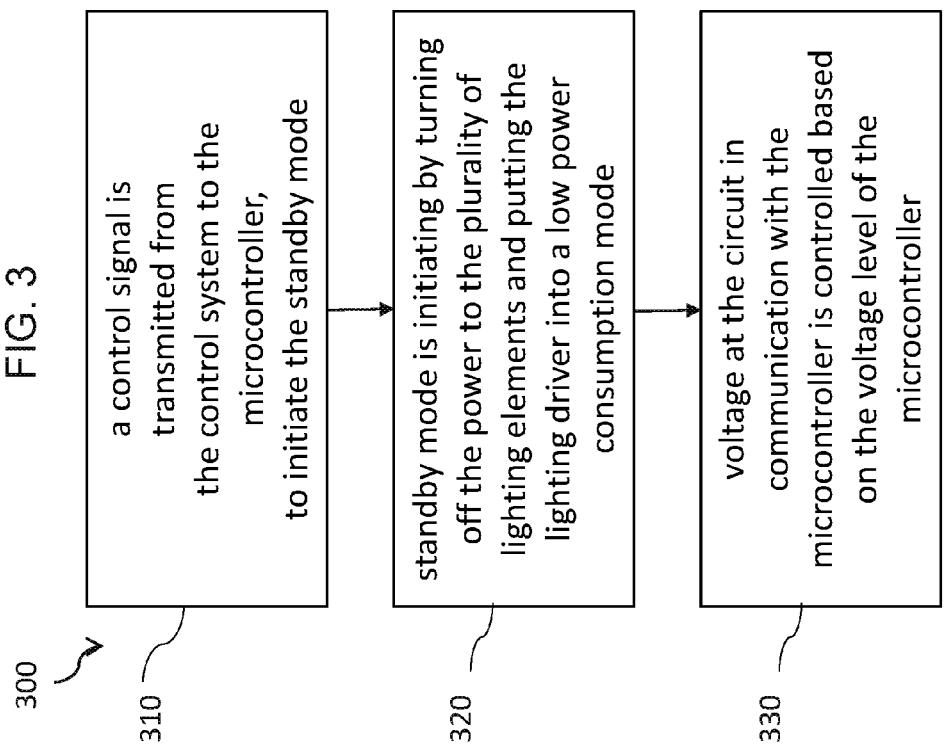

GATE VOLTAGE THRESHOLD TURN OFF FOR MAINTAINING VOLTAGE SUPPLY DURING STANDBY MODE OF A LIGHTING SYSTEM

I. TECHNICAL FIELD

The technical field relates generally to a lighting control system. In particularly, a method of controlling gate voltage to maintain sufficient power to a microcontroller of a lighting (LED) driver, in order to facilitate receiving and transmitting of messages between the lighting control system and the microcontroller during standby mode of the lighting system.

II. BACKGROUNDS

A lighting system e.g., a digital addressable lighting interface ("DALI") system, includes a control system for controlling an operation of a plurality of lighting elements (e.g., luminaires) via a lighting driver including a microcontroller for controlling the plurality of lighting elements based on control signals received from the control system. The control system controls various operating modes of the lighting elements such as on/off and standby/sleep mode. During standby/sleep mode, the control system sends a control signal to the microcontroller of the lighting driver, to turn the lighting elements off, and the lighting driver goes into a low power consumption mode. While the lighting elements are in standby/sleep mode, it is necessary for the microcontroller to receive sufficient power in order to continue to receive messages from and transmit messages to the control system. If sufficient power is not supplied to the microcontroller, messages may not be transmitted or received from the control system, thereby causing undesired operational issues within the lighting system and possible failure to meet lighting communication standards (e.g., DALI).

III. SUMMARY OF THE EMBODIMENTS

The various embodiments of the present disclosure are configured to provide a lighting system and a method for maintaining power supply of the microcontroller by increasing the power supply at the microcontroller and thereby allow continued communications (receiving and transmitting of messages) between the microcontroller and the control system.

In one exemplary embodiment, a lighting system is provided. The lighting system comprising a plurality of lighting elements configured to emit light; a power supply configured to supply power; a lighting driver comprising a microcontroller and configured to output power to the plurality of lighting elements for operation thereof; a control system configured to transmit a control signal to the microcontroller to initiate a standby mode of the plurality of lighting elements; and a semiconductor device configured to receive voltage from the microcontroller, and selectively enable and disable a low power consumption mode of the lighting driver, to thereby maintain voltage for communication between the microcontroller and the control system during the standby mode.

In another exemplary embodiment, a method is provided. The method comprising outputting power to a plurality of lighting elements within a lighting system; transmitting a control signal from a control system to a microcontroller of a lighting driver, to initiate a standby mode; and selectively enabling and disabling a low power consumption mode of the lighting driver, to maintain voltage for communication between the microcontroller and the control system during the standby mode.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

FIG. 3 is a flow diagram of an exemplary method for maintaining sufficient power to the microcontroller during standby mode of the lighting system according to one or more other exemplary embodiments.

Figure 1:
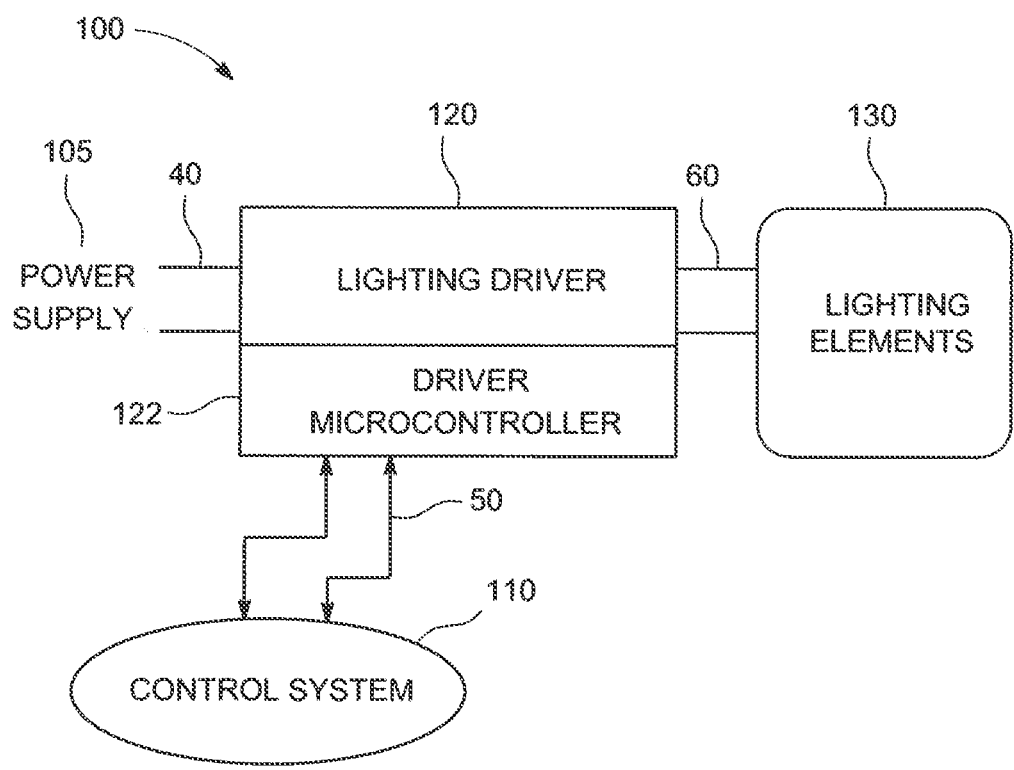
FIG. 1 is schematic illustration of a lighting system according to one or more exemplary embodiments.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary embodiments of the present invention provide a lighting system and method for maintaining voltage supply to a microcontroller of a lighting driver in a lighting system, to continue to receive and transmit signals (i.e., messages) to and from a control system of the lighting system during standby mode thereof.

FIG. 1 is schematic illustration of a lighting system 100 according to one or more exemplary embodiments.

The lighting system 100 comprises a power supply 105, a control system 110, a lighting driver 120, and a plurality of lighting elements 130.

The lighting system 100 may be a digital addressable lighting interface (DALI) system or any other type of lighting system suitable for implementation of the exemplary embodiments shown in FIGS. 1 through 4.

According to one or more embodiments, the power supply 105 is configured to supply an alternate current (AC) power supply to the lighting driver 120 for operating the lighting elements 130 via wires 40. The power supply 105 is internal to the lighting system 100. The power supply 105 may be of a range of 120 volts (V) to approximately 277 volts (V). The present invention is not limited to any particular power supply and therefore the power supply may be varied as necessary.

According to one or more embodiments, the control system 110 may be a DALI control system or any other suitable type of control system for the purposes set forth herein. The control system 110 is configured to control the lighting driver 120 by sending a control signal thereto, for controlling the various operations of the lighting elements 130, for example, dimming modes, standby/sleep mode, and driver queries.

The lighting driver 120 (e.g., an Lighting driver), comprises a microcontroller 122 for receiving control signals (i.e., messages) from the control system 110 and acting upon the control signals by controlling the lighting driver 120 to operate the lighting elements 130 when needed, and transmitting messages to the control system 110 via wires 50. The microcontroller 122 may be programmable or hardwired. The lighting driver 120 converts the ac power supply 105 voltage and current to a constant voltage or constant current source for the lighting elements 130 via wires 60, may further comprises a connection to a current sensor of the overall lighting system 100 and a current converter for converting the power (in the form of input current) received from the power supply 105 into a lighting source current for supplying power to the lighting elements 130 via wires 60. Further, the lighting (LED) lighting driver 120 comprises of circuit 125 that during standby/sleep mode powers microcontroller 122 and reduces power consumption of the lighting driver 120 when in standby/sleep mode. Accordingly, the output current levels to the lighting driver 120 may be adjusted as needed based on commands received by the microcontroller 122 from control system 110. When the microcontroller 122 receives an off or standby control signal from the controls system 110, the microcontroller 122 controls different components within the circuit 125 to turn the lighting elements 130 to the on/off modes or standby/sleep mode and puts the lighting driver into a low power consumption mode.

According to one or more exemplary embodiments, the lighting driver 120 may comprises additional components for monitoring and enhancing operation of the lighting elements 130, for example, a temperature sensor for sensing temperature related to the lighting elements 130.

The lighting elements 130 may be light-emitting diodes (LEDs) such as semiconductor, organic or polymeric LEDs or similar devices. The lighting elements 130 are configured to receive output power from the lighting driver 120 and to emit light as controlled.

A detailed description of a control operation of the lighting driver 120 and the microcontroller 122 for maintaining sufficient voltage supply at the microcontroller 122 during standby mode of the lighting system, will now be described below with reference to FIGS. 2 and 3.

Figure 2:
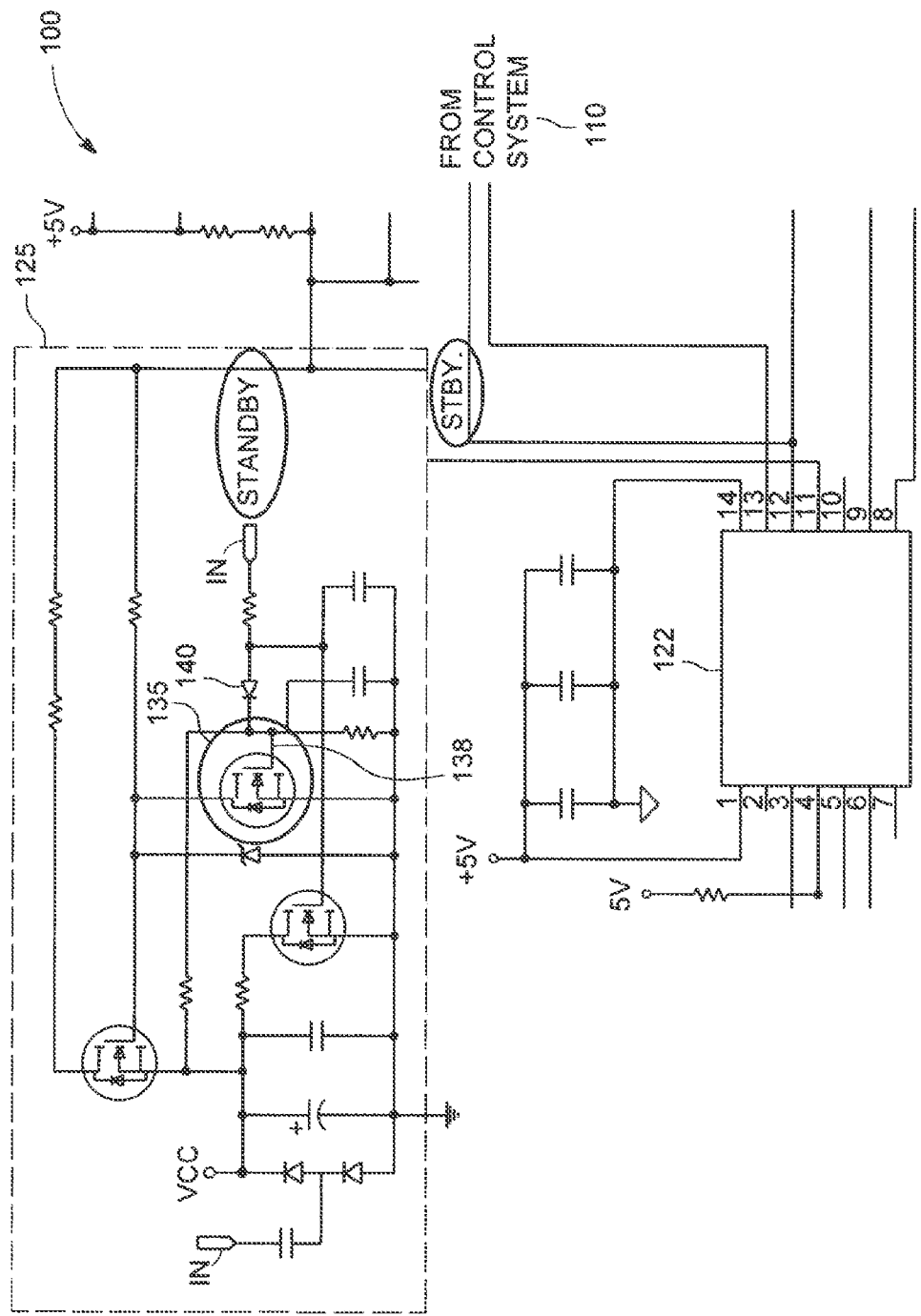
FIG. 2 is a circuit schematic illustration of the lighting system including power supply operation of the microcontroller to be implemented within the lighting system according to one or more exemplary embodiments.

FIG. 2 is a circuit schematic illustration of the lighting system 100 including power supply operation of the microcontroller 122 to be implemented within the lighting system 100 according to one or more exemplary embodiments.

As shown in FIG. 2, the microcontroller 122 is connected to the control system 110 and receives a standby signal ("STBY") via an input pin thereof as shown and the microcontroller 122 controls the circuit 125 by controlling a semiconductor device 135 to open or close in order to operate in a high power consumption mode or a low power consumption mode.

According to one or more exemplary embodiments, the semiconductor device 135 comprises a transistor including a gate 138 in electrical communication with the standby control signal from the microcontroller 122 via a diode 140.

The voltage at the gate 138 triggers the semiconductor device 135 to open or close based on the power consumption mode desired. For example, when the standby mode is initiated, the semiconductor device 135 closes and the lighting driver 120 operates in a low power consumption mode. If it is determined that the voltage is below a gate threshold voltage of the semiconductor device 135, then the semiconductor device 135 opens and lighting driver 120 is operated at a high power consumption mode for a specified time period in order to increase the voltage (VDD) as needed. For example, the predetermined voltage (VDD) may be approximately 5 volts (V) on the standby signal ("STANDBY") input at the circuit 125. Therefore, microcontroller 122 is able to continue receiving control signals (i.e., messages/commands) from the control system 110. For example, if when in a standby mode, the control system 110 then sends a message to the lighting driver 120 to change the operating mode of the lighting elements 130 from standby mode to on mode, then the lighting driver 120 can still receive messages from the control system 110 and control the lighting elements 130 accordingly. That is, during this low power consumption mode the lighting driver 120 is able to continue to receive and transmit messages to and from the control system 110.

Thus, according to one or more exemplary embodiments, if the voltage (VDD) drops, the voltage for the standby signal which is the voltage to the microcontroller 122 drops, and the gate 138 of the semiconductor device 135 opens and allows the voltage at the gate 138 to be increased.

FIG. 3 is a flow diagram of an exemplary method 300 for maintaining voltage supply to the microcontroller 122 during standby mode of the lighting system 100 according to one or more other exemplary embodiments.

In step 310, a control signal is transmitted from the control system to the microcontroller, to initiate the standby mode.

From step 310, the process continues to step 320, where standby mode is initiating by turning off the power to the plurality of lighting elements and putting the lighting driver into a low power consumption mode based on the control signal received at the microcontroller.

From the step 320, the process continues to step 330, where voltage at the circuit in communication with the microcontroller is controlled based on the voltage level of the microcontroller in order to maintain voltage for transmitting and receiving signals to and from the control system while in standby mode.

According to one or more exemplary embodiments, at step 330, the voltage level of the microcontroller is maintained by operation of a semiconductor device 135 within the circuit 125 as shown in FIG. 2. At the semiconductor device, the gate voltage thereof is measured and adjusted as needed, to facilitate receiving and transmitting of messages during standby mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting system comprising:
   a plurality of lighting elements configured to emit light;
   a power supply configured to supply power;
   a lighting driver comprising a microcontroller and configured to output power to the plurality of lighting elements for operation thereof;
   a control system configured to transmit a control signal to the microcontroller to initiate a standby mode of the plurality of lighting elements; and
   a semiconductor device configured to (i) receive voltage from the microcontroller, and (ii) selectively enable and disable a low power consumption mode of the lighting driver, wherein the semiconductor device is configured to receive a first predetermined voltage level from the microcontroller, to enable a low power consumption mode, and receive a second predetermined voltage level to disable the low power consumption mode, for maintaining communication between the microcontroller and the control system during standby mode.

2. The lighting system of claim 1, wherein the microcontroller is configured to receive the control signal and decrease output power supplied to the plurality of lighting elements during the standby mode.

3. The lighting system of claim 1, wherein the power supply is configured to supply alternate current (AC) power to the lighting driver, for operating the plurality of lighting elements.

4. The lighting system of claim 1, wherein the microcontroller is programmable.

5. The lighting system of claim 1, wherein the lighting driver further comprises:
   a circuit including the semiconductor device and controllable by the microcontroller, and configured to receive a predetermined voltage level from the microcontroller during standby mode.

6. The lighting system of claim 5, wherein the semiconductor device is a transistor having a gate configured to receive the first predetermined voltage level from the microcontroller.

7. The lighting system of claim 6, wherein when the gate is open, the lighting driver operates in a high power consumption mode, and when the gate is closed, the lighting driver operates in a low power consumption mode.

8. The lighting system of claim 7, wherein when the gate is open, the voltage is adjusted to be increased to the second predetermined voltage level, after which the gate closes and the lighting driver operates in the low power consumption mode.

9. A method comprising:
   outputting power to a plurality of lighting elements within a lighting system;
   transmitting a control signal from a control system to a microcontroller of a lighting driver, to initiate a standby mode; and
   selectively enabling and disabling a low power consumption mode of the lighting driver via a semiconductor device receiving voltage from the microcontroller, wherein the semiconductor device mode receiving a first predetermined voltage level from the microcontroller, to enable a low power consumption mode; and receiving a second predetermined voltage level to disable the low power consumption mode, for maintaining communication between the microcontroller and the control system during standby mode.

10. The method of claim 9, wherein initiating the standby mode comprises:
    decreasing power supply from the lighting driver to the plurality of lighting elements based on the control signal received at the microcontroller.

11. The method of claim 9, wherein selectively enabling and disabling the low power consumption mode comprises:
    controlling voltage at a circuit in communication with the microcontroller based on a voltage level of the microcontroller for maintaining communication between the microcontroller and the control system during standby mode.

12. The method of claim 9, wherein the microcontroller is programmable.

13. The method of claim 9, wherein the semiconductor device is a transistor having a gate, and the method further comprises:
    receiving at the gate, the voltage from the microcontroller; and
    adjusting the voltage to maintain the voltage for performing communication between the microcontroller and the control system.

14. The method of claim 13, further comprising operating the lighting driver in the low power consumption mode when the gate is closed, and operating the lighting driver in a high power consumption mode when the gate is open.

15. The method of claim 14, further comprising, adjusting the voltage to be increased to the second predetermined voltage level when the gate is open, and after which closing the gate and operating the lighting driver in the low power consumption mode.

* * * * *

UNITED STATES PATENT AND TRADEMARK OFFICE
CERTIFICATE OF CORRECTION

PATENT NO. : 9,544,972 B2
APPLICATION NO. : 14/537361
DATED : January 10, 2017
INVENTOR(S) : Scheidegger et al.

It is certified that error appears in the above-identified patent and that said Letters Patent is hereby corrected as shown below:

In Column 1, Line 16, delete "II. BACKGROUNDS" and insert -- II. BACKGROUND --, therefor.

Signed and Sealed this
Twenty-third Day of May, 2017

Michelle K. Lee
*Director of the United States Patent and Trademark Office*